(12) United States Patent
Kim et al.

(10) Patent No.: US 12,148,281 B2
(45) Date of Patent: Nov. 19, 2024

(54) DATA LOGGER DEVICE

(71) Applicant: AMOSENSE CO., LTD., Cheonan-si (KR)

(72) Inventors: In Eung Kim, Cheonan-si (KR); Jin Sung Yang, Cheonan-si (KR); Byeong An Yu, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 169 days.

(21) Appl. No.: 17/905,703

(22) PCT Filed: Mar. 5, 2021

(86) PCT No.: PCT/KR2021/002755
§ 371 (c)(1),
(2) Date: Sep. 6, 2022

(87) PCT Pub. No.: WO2021/182805
PCT Pub. Date: Sep. 16, 2021

(65) Prior Publication Data
US 2023/0096737 A1    Mar. 30, 2023

(30) Foreign Application Priority Data
Mar. 10, 2020    (KR) .......................... 10-2020-0029508

(51) Int. Cl.
*G08B 3/00*    (2006.01)
*G01D 9/00*    (2006.01)
(Continued)

(52) U.S. Cl.
CPC ............. *G08B 21/18* (2013.01); *G01D 9/005* (2013.01); *G08B 5/00* (2013.01)

(58) Field of Classification Search
CPC .......... G08B 21/18; G08B 5/00; G01D 9/005; G01D 7/005; G01D 9/28; G06K 19/06; G06K 19/06037; H04W 4/80
(Continued)

(56) References Cited

U.S. PATENT DOCUMENTS

| 11,615,367 B2* | 3/2023 | Lawler, Jr. ........ G06K 19/06046 |
| | | 705/333 |
| 2006/0214788 A1* | 9/2006 | Ku .......................... G16H 40/67 |
| | | 340/572.1 |

(Continued)

FOREIGN PATENT DOCUMENTS

| JP | 2014162843 A | 9/2014 |
| KR | 1020120121495 A | 11/2012 |

(Continued)

OTHER PUBLICATIONS

International Search Report issued in PCT/KR2021/002755 dated Jun. 21, 2021, 5 pages.

*Primary Examiner* — Anh V La
(74) *Attorney, Agent, or Firm* — ROTHWELL, FIGG, ERNST & MANBECK, P.C.

(57) ABSTRACT

A data logger device is provided. The data logger device according to an example embodiment of the present invention comprises: a sensing unit mounted on one surface of a flexible printed circuit board, and including a sensor that detects at least one piece of information; a display unit that, when an abnormal state is detected on the basis of information measured via the sensing unit, irreversibly displays the abnormal state; a control unit that controls driving of the sensing unit and the display unit; a power supply unit that provides driving power to the control unit; and a cover member that prevents the outside exposure of the sensing unit, the display unit, the control unit, and the power supply unit.

10 Claims, 6 Drawing Sheets

(51) Int. Cl.
*G08B 5/00* (2006.01)
*G08B 21/18* (2006.01)
(58) Field of Classification Search
USPC .... 340/691.8, 691.6, 691.1, 693.5, 540, 571
See application file for complete search history.

(56) References Cited

U.S. PATENT DOCUMENTS

| | | | |
|---|---|---|---|
| 2007/0075842 A1* | 4/2007 | Russell | A61J 7/0481 340/309.16 |
| 2015/0310385 A1* | 10/2015 | King | G06Q 10/087 705/28 |
| 2016/0148027 A1* | 5/2016 | Schoutens | G06K 19/07749 340/10.1 |
| 2017/0228519 A1* | 8/2017 | Chu | G06K 19/07703 |
| 2017/0229000 A1* | 8/2017 | Law | G06K 19/0717 |
| 2018/0196401 A1 | 7/2018 | Lagares-Greenblatt et al. | |
| 2020/0210952 A1 | 7/2020 | Kim et al. | |

FOREIGN PATENT DOCUMENTS

| | | |
|---|---|---|
| KR | 20130095057 A | 8/2013 |
| KR | 20190036756 A | 4/2019 |

\* cited by examiner

DATA LOGGER DEVICE

CROSS REFERENCE TO RELATED APPLICATIONS

This application is a 35 U.S.C. 371 National Phase Entry Application from PCT/KR2021/002755 filed Mar. 5, 2021, which claims priority to and the benefit of Korean Patent Application No. 10-2020-0029508, filed on Mar. 10, 2020, the disclosures of which are incorporated herein by reference in their entirety.

TECHNICAL FIELD

The present invention relates to a data logging device and, more particular, to a data logging device that is capable of irreversibly indicating an abnormal state of a logistics item.

BACKGROUND

Near Field Communication (NFC)/Radio Frequency Identification (RFID) data logging devices are being used to track the state of a logistics item such as fresh food. That is, when detecting any abnormality such as temperature change of or impact to the fresh food in the course of logistics delivery, the NFC/RFID data logging device indicates the abnormality.

Typically, the NFC/RFID data logging device indicates whether an abnormality has occurred via a light-emitting diode (LED). Such an NFC/RFID data logging device operates on the power of a very small and small-capacity battery. In this case, if the delivery period of a logistics item takes more than one week, the power consumption of the LED increases as well, so there is a limit that the LED cannot operate all the time.

That is, although it is preferable, in the logistics checking the state of logistics item such as fresh food, that the LED keeps constantly turned on to detect an abnormality such as temperature change or impact for immediate notice to an on-site operator, there is a limit to keep the LED turned on due to the limit of battery capacity.

For this reason, in order to minimize power consumption, the conventional NFC/RFID data logging device has no choice but to check whether there is an abnormality by sporadically keeping the LED turned on when an abnormality is detected or by pressing a state check button to turn on the LED.

Furthermore, performing the on-site logistics work in such a way as to make an immediate visual decision with an individual check for abnormalities by pressing the state check button for a large number of logistics items has a drawback of increasing the time required for confirmation work and workload of the operator.

SUMMARY OF THE INVENTION

The present invention has been conceived in consideration of the above points, and it is an object to provide a data logging device capable of immediately checking with the naked eyes whether an abnormality such as a temperature change of or an external impact to logistics item occurs in the course of logistics delivery.

Also, it is another object of the present invention to provide a data logging device capable of preventing, when an abnormal state occurs in the course of logistics delivery, change from the abnormal state to a normal state.

In order to solve the above problems, the present invention provides a data logging device including a sensing part mounted on one surface of a flexible circuit board and including a sensor sensing at least one information, an indication part irreversibly indicating, when an abnormal state is detected based on information measured via the sensing part, the abnormal state, a control part controlling operations of the sensing part and the indication part, a power supply part supplying driving power to the control part, and a cover member preventing the sensing part, the indication part, the control part, and the power supply part from being exposed to outside.

Also, the sensing part may include at least one of a temperature sensor, a humidity sensor, an acceleration sensor, an illumination sensor, and an ultraviolet (UV) sensor.

Also, the indication part may include resistance patterns formed into a pattern on one surface of the flexible circuit board and generating, when detecting the abnormal state, heat via driving of the control part and irreversible color-changing materials disposed on a upper portion of the resistance patterns and being discolored by the heat transferred from the resistance patterns. Here, the irreversible color-changing materials may be provided as a sheet.

For example, the irreversible color-changing materials may be attached on an inner surface of the cover member, and the cover member may include openings formed through regions corresponding to the irreversible materials. Through this, the irreversible color-changing materials may be exposed to the outside through the openings.

Also, the indication part may include a first indicator indicating a normal operation state, a second indicator indicating the abnormal state, and a third indicator indicating power on/off.

Also, the power supply part may be a flexible thin film printing battery.

Also, the data logging device may further include a communication part formed into a pattern on one surface of the flexible circuit board and transmitting and receiving data through wireless communication. Here, the communication part may be an NFC antenna module.

Also, the data logging device may further include a memory part storing information measured via the sensing part.

Also, the data logging device may further include a Quick Response (QR) code provided on an exposed surface of the cover member.

Also, the cover member may be made of a flexible material.

According to the present invention, it is possible for an indication part to remain in a discolored state when an abnormality such as temperature change of or external impact to a logistics item occurs in the course of logistics delivery. Through this, the operator can immediately check with the naked eye whether an abnormality has occurred. In addition, even when a small-capacity battery is used, the indication part can remain in a discolored state, thereby solving battery capacity problem.

Also, the present invention is capable of improving security and reliability by enabling the indication part to remain in an irreversibly discolored state when an abnormal state occurs in the course of logistics delivery.

DETAILED DESCRIPTION

Hereinafter, embodiments of the present invention will be described in detail with reference to accompanying drawings in order for those skilled in the art to easily practice the invention. The present invention may be embodied in many different forms and is not limited to the embodiments described herein. In order to clearly describe the present invention, parts irrelevant to the description may be omitted in the drawings, and the same reference numerals may be used for the same or similar components throughout the specification.

A data logging device 100 according to one embodiment of the present invention may track state information in the course of delivering or storing a logistics item such as fresh food, and an operator or a user may immediately check whether an abnormal state occurs by indicating whether an abnormal state occurs when an abnormal state occurs in the course of delivering or storing logistics item.

Here, the logistics item may be room temperature storage vials, dark room storage vials, low temperature refrigerated storage products, low temperature storage products, frozen fresh meat, low temperature refrigerated protein injection blood samples, and the like.

Figure 5:
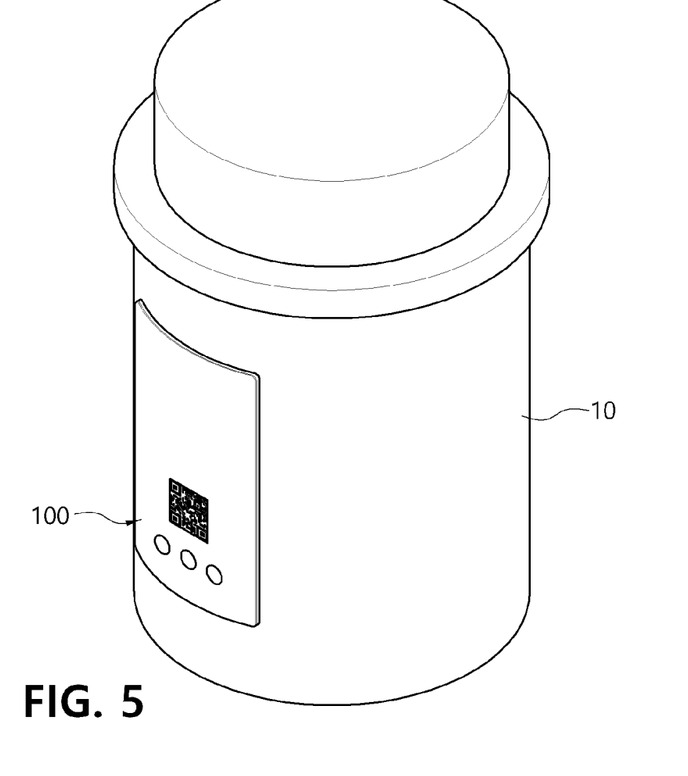
FIGS. 5 to 7 are diagrams illustrating a state of using a data logging device according to one embodiment of the present invention.
Figure 6:
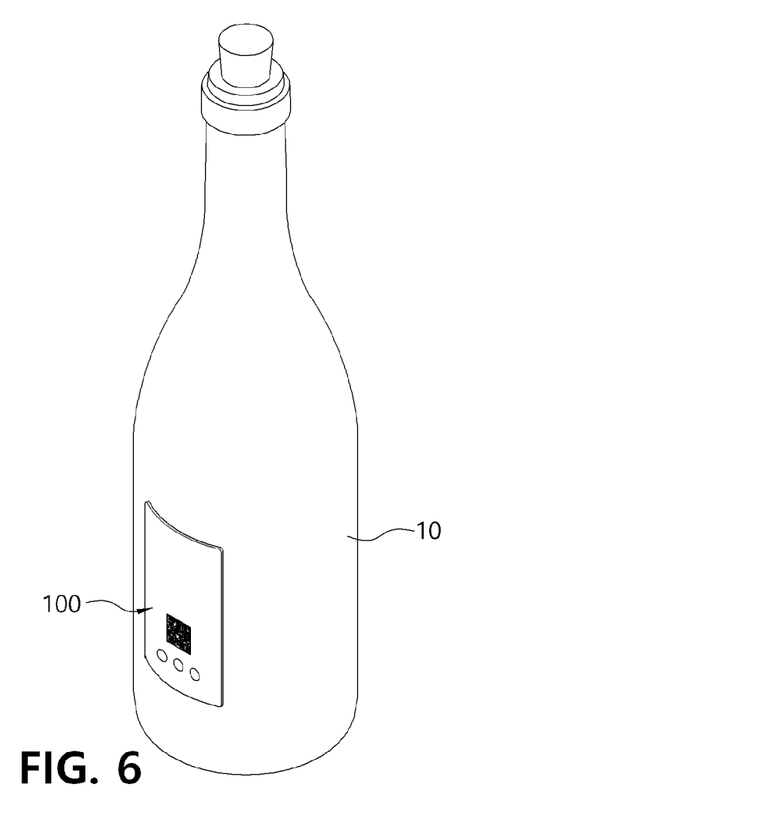
Figure 7:
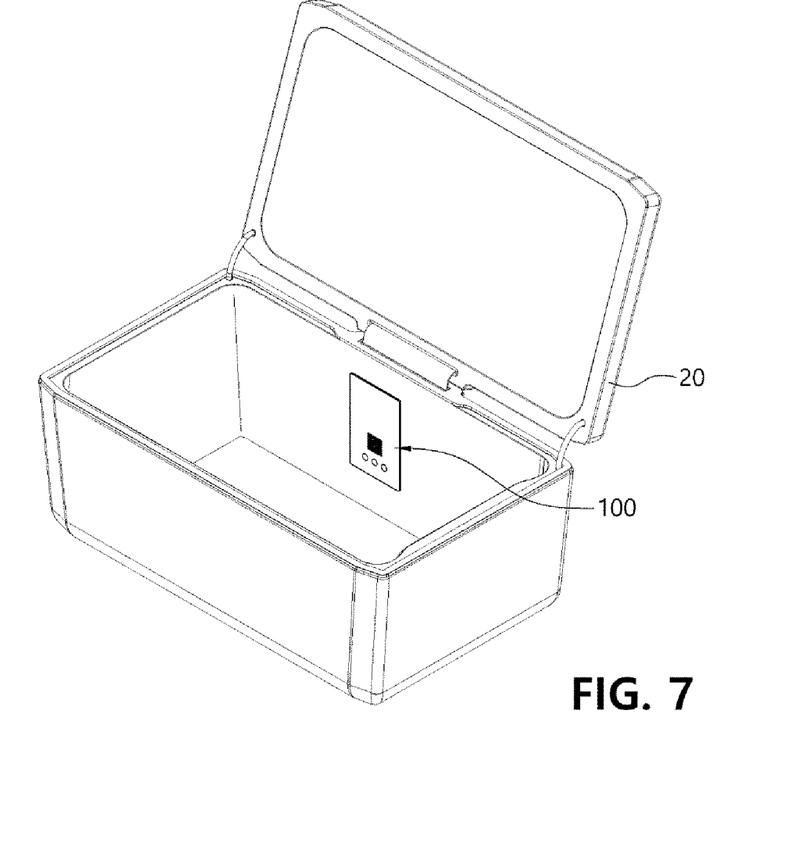

The data logging device 100 may be directly attached to the logistics item 10 as shown in FIGS. 5 and 6 or may be attached to a container 20 such as a box or a bottle in which the logistics item 10 is accommodated as shown in FIG. 7.

In addition, the abnormal state may be a state in which the storage temperature of the logistics item is out of the recommended storage temperature range, a state in which the expiration date of the logistics item has passed, a state in which an impact is applied to the logistics item from the outside, a state in which the container 20 storing the logistics item is opened, or a state in which the container 20 storing the logistics item is unboxed, and may be variously changed according to the kind of the logistics item.

Figure 1:
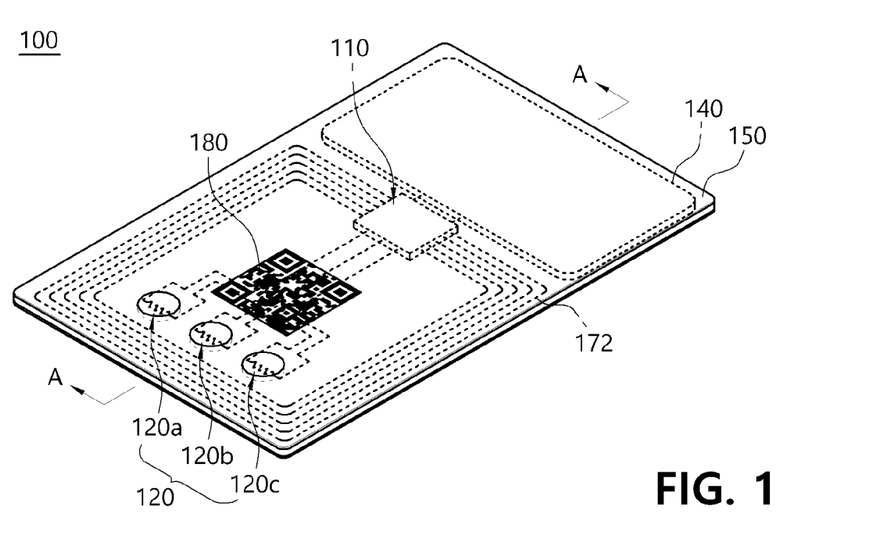
FIG. 1 is a diagram illustrating a data logging device according to one embodiment of the present invention.
Figure 2:
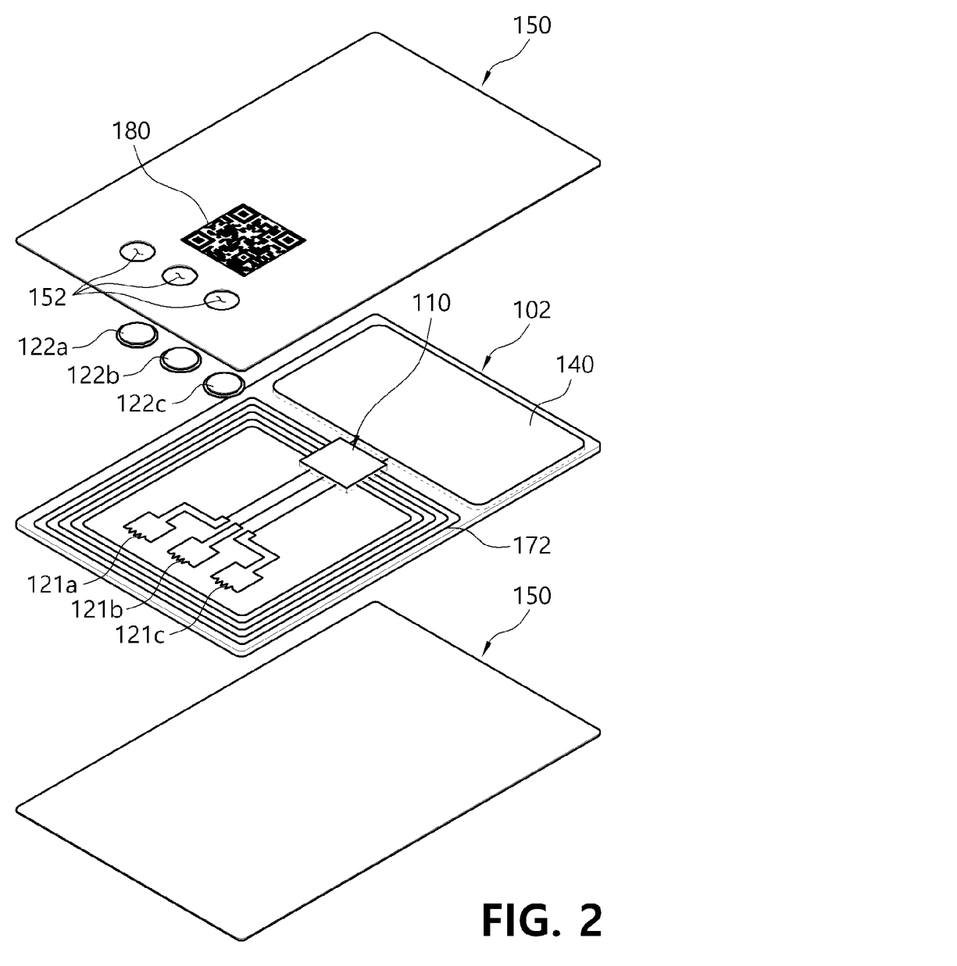
FIG. 2 is a diagram illustrating a separated state of the cover member in FIG. 1.
Figure 3:
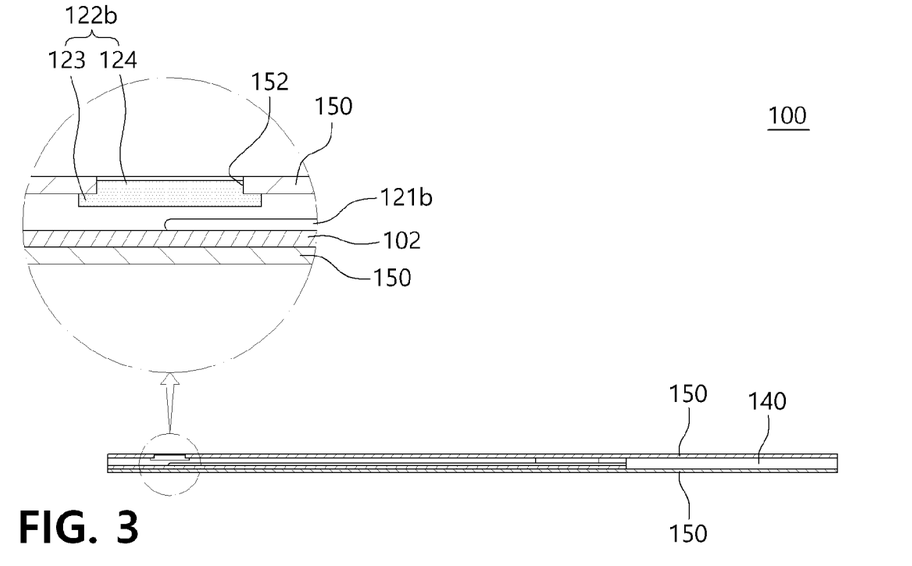
FIG. 3 is a cross-sectional view along A-A line in FIG. 1.

As shown in FIGS. 1 to 3, the data logging device 100 includes a sensing part 110, an indication part 120, a control part 130, a power supply part 140, and a cover member 150.

The sensing part 110 may sense the state information of the logistics item or the container 20 storing the logistics item.

That is, the sensing part 110 may sense at least one of a storage temperature of the logistics item, a storage time of the logistics item, an external impact applied to the logistics item, illuminance, and an acceleration of the logistics item. Through this, the sensing part 110 may detect whether an abnormal state occurs to the logistics item or the container 20.

To this end, the sensing part 110 may include at least one sensor mounted on a flexible circuit board 102. As a specific example, the sensor may include at least one of a temperature sensor, a humidity sensor, an acceleration sensor, an illumination sensor, and an Ultraviolet (UV) sensor, and the sensing part 110 may preferably include at least two sensors to obtain various information.

The overall operation of the sensing part 110 may be controlled by the control part 130, and the control part 130 may receive driving power from the power supply part 140. In addition, power supply from the power supply part 140 to the control part 130 may be turned on/off through a user operation of a physical switch (not shown) electrically connected to the control part 130, or may be started through an energy harvesting method or an authentication method using NFC without use of a physical switch.

In addition, the information obtained through the sensing part 110 may be stored in a separate memory part 160.

The indication part 120 may indicate, when it is determined that an abnormal state occurs to the logistics item or the container 20 based on the information measured through the sensing part 110, the occurrence of the abnormal state under the control of the control part 130.

In this case, the indication part 120 may irreversibly indicates the occurrence of the abnormal state of the logistics item or the container 20.

To this end, the indication part 120 may include resistance patterns 121a, 121b, and 121c formed into a pattern on one surface of the flexible circuit board 102 and irreversible color-changing materials 122a, 121b, and 121c disposed on a upper portion of the resistance patterns 121a, 121b, and 121c and discolored by heat transferred from the resistance patterns 121a, 121b, and 121c.

Here, the indication part 120 may supply, when an abnormal state is detected through the sensing part 110, power received from the power supply part 140 to the resistance patterns 121a, 121b, and 121c under the control of the control part 130, and the resistance patterns 121a, 121b, and 121c may emit heat generated by the power supplied from the power supply part 140.

In addition, the irreversible color-changing materials 122a, 122b, and 122c may be implemented as sheets including an irreversible color-changing dye, include a known irreversible thermochromic dye that does not return to an initial color when a color is changed once by heat, and the sheets may be disposed to cover resistance patterns 121a, 121b, and 121c.

In addition, the irreversible color-changing materials 122a, 122b, and 122c may be disposed to be spaced apart from the resistance patterns 121a, 121b, and 121c at a predetermined distance or to directly contact the resistance patterns 121a, 121b, and 121c.

Accordingly, the irreversible color-changing materials 122a, 122b, and 122c may be discolored by heat transferred from the resistance patterns 121a, 121b, and 121c when the resistance patterns 121a, 121b, and 121c generate heat, and the irreversible color-changing materials 122a, 122b, and 122c may maintain the changed color even after a long time.

For this reason, the user or the operator can immediately check whether an abnormal state has occurred to the logistics item or the container 20 by checking whether the irreversible color-changing material 122a, 122b, and 122c is discolored.

In addition, the data logging device 100 according to one embodiment of the present invention is capable of reducing power consumption for driving the indication part 120 by indicating an abnormal state occurrence of the logistics item or the container 20 through color-changing of the irreversible color-changing materials 122a, 122b, and 122c by heat generated from the resistance patterns 121a, 121b, and 121c, instead of using the method of turning on/off an LED.

Accordingly, the data logging device 100 according to one embodiment of the present invention can solve the battery capacity problem by minimizing power consumption even when the power supply part 140 is configured with a small-capacity coin battery or printing battery.

In addition, the data logging device 100 according to one embodiment of the present invention can prevent user's manipulation by using the irreversible color-changing materials 122a, 122b, and 122c having irreversibility that is not restored to the original color once discolored.

Accordingly, the data logging device 100 according to one embodiment of the present invention can be used as an irreversible state indicator that cannot be manipulated by a user, thereby having excellent security and giving credence to the result of where an abnormal state has occurred to the logistics item or the containers 20.

In this case, although the indication part 120 can be configured with a function indicating an information on occurrence of only the abnormal state of the logistics item or container 20, it may also indicate other information along with the information on occurrence of the abnormal state of the logistics item or container 20.

For example, the indication part 120 may indicate information on the normal operation state of the data logging device 100 and power on/off of the data logging device 100 along with the information on the occurrence of an abnormal state of the logistics item or container 20.

To this end, the indication part 120 may include a first indicator 120a indicative of information on the normal operating state of the data logging device 100, a second indicator 120b indicative of information on occurrence of abnormal state of the logistics item or container 20, and a third indicator 120c indicative of information on power on/off of the data logging device 100.

In this case, the first indicator 120a, the second indicator 120b, and the third indicator 120c may be implemented in the same manner. That is, as described above, the first indicator 120a, the second indicator 120b, and the third indicator 120c may respectively include a first resistance pattern 121a, a second resistance pattern 121b, and a third resistance pattern 121c formed into a pattern on one surface of the flexible circuit board, and a first irreversible color-changing material 122a, a second irreversible color-changing material 122b, and a third irreversible color-changing material 122c disposed on a upper portion of the first resistance pattern 121a, the second resistance pattern 121b, and the third resistance pattern 121c in a one-to-one corresponding manner.

Here, although the first irreversible color-changing material 122a, the second irreversible color-changing material 122b, and the third irreversible color-changing material 122c may be discolored to the same color as each other by the heat provided from each of the resistance patterns 121a, 121b, and 121c, they may be discolored to different colors to increase user's or operator's distinguishability.

For example, the first irreversible color-changing material 122a may be discolored from white to green when the data logging device 100 is in a normal operating state, the second irreversible color-changing material 122b may be discolored from white to red when an abnormal state occurs on the logistics item or container 20, and the third irreversible color-changing material 122c may be discolored from white to blue when the power is changed from an off state to an on state.

That is, the first irreversible color-changing material 122a, the second irreversible color-changing material 122b, and the third irreversible color-changing material 122c may have the same initial color (e.g., white) and change to different colors (e.g., green, red, and blue) when the state changes.

Accordingly, an operator or a user may be able to immediately check with the naked eye using the discolored colors of the first indicator 120a, the indicator 120b, and the third indicator 120c.

However, in the present invention, the discolored colors of the first irreversible color-changing material 122a, the second irreversible color-changing material 122b, and the third irreversible color-changing material 122c are not limited to the above-described colors, and various known colors can be appropriately applied.

Meanwhile, the irreversible color-changing materials 122a, 122b, and 122c may be attached to the inner surface of the cover member 150 via an adhesive layer and exposed, at least in part, to the outside in order for a user to easily check whether the irreversible color-changing materials 122a, 122b, 122c are discolored.

To this end, the cover member 150 may include openings 152 penetrating through the regions corresponding to the irreversible color-changing materials 122a, 122b, and 122c, as shown in FIGS. 2 and 3.

Accordingly, at least a portion of the irreversible color-changing materials 122a, 122b, and 122c may be exposed to the outside through the openings 152 while being attached to the inner surface of the cover member 150 via the adhesive layer.

Here, each of the irreversible color-changing materials 122a, 122b, and 122c may include a protrusion 124 protruded at a predetermined height from the body 123 thereof so as to be, at least in part, exposed through the opening 152 while securing a contact area with the cover member 150, and the protrusion 124 may have a cross-sectional area corresponding to the opening 152.

Accordingly, the data logging device 100 according to one embodiment of the present invention is capable of allowing an operator or a user to easily identify whether the irreversible color-changing materials 122a, 122b, and 122c are discolored through the protrusion 124 exposed to the outside via the opening 152 while blocking foreign substances from being introduced into the inside of the cover member 150 from the outside through the protrusion 124 inserted into the opening 152.

However, the arrangement relationship of the irreversible color-changing materials 122a, 122b, and 122c is not limited thereto, and the opening 152 may be covered by a separate cover member (not shown) made of a transparent material for easy identification of whether the irreversible color-changing materials 122a, 122b, and 122c are discolored, while blocking the inflow of foreign substances through the opening 152. Alternatively, it may also be possible to form the cover member 150 using a transparent material in order for an operator or a user to easily identify whether the irreversible color-changing materials 122a, 122b, and 122c attached to the inner surface of the cover member 150 are discolored using the transparency of the cover member 150 without forming the opening 152 at positions corresponding to the irreversible color-changing materials 122a, 122b, and 122c in the cover member 150.

The power supply part 140 may be electrically connected to the flexible circuit board 102 to provide driving power to the control part 130.

Such a power supply part 140 may be a known coin battery or a prismatic battery, but may be configured as a known printing battery to reduce the overall weight and volume. The power supply part 140 may also be a plate-shaped flexible battery to increase the capacity while reducing the overall weight and volume.

As a specific example, the power supply part 140 may be composed of one of a well-known paper battery, a pouch-type battery, a coin battery, and a printing battery.

The power supply part 140 may also be a primary battery or a reusable secondary battery and, in the case where the power supply part 140 is configured as a secondary battery, the power supply part 140 may be recharged using a wireless power transfer method.

The control part 130 may control overall operations of the data logging device 100.

For example, the control part 130 may generate valid information based on a signal sensed by the sensing part 110 and may supply power to the resistance patterns 121a, 121b, and 121c constituting the indication part 120 based on the generated valid information. In addition, the control part 130 may control on/off driving of the data logging device 100.

To this end, the control part 130 may include at least one circuit element mounted on one surface of the flexible circuit board 102. As a specific example, the control part 130 may be a system semiconductor such as a microcontroller part (MCU).

Figure 4:
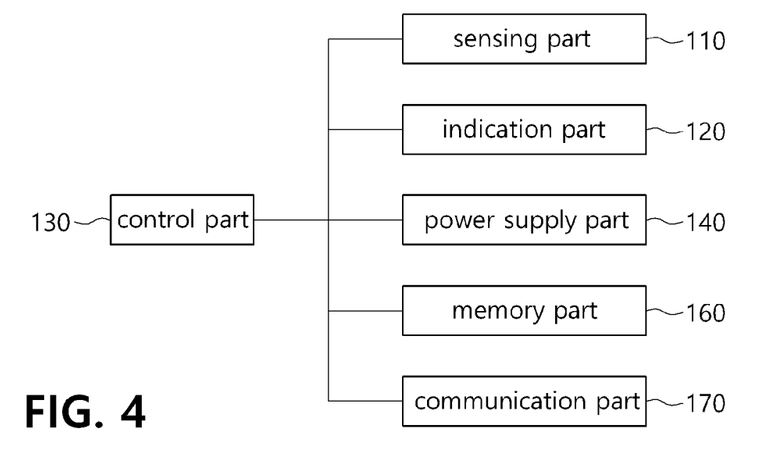
FIG. 4 is a block diagram illustrating a configuration of main components applicable to a data logging device according to one embodiment of the present invention.

In this case, the data logging device 100 according to one embodiment of the present invention may further include a memory part 160 for storing various information acquired through the sensing part 110 as shown in FIG. 4.

The memory part 160 may serve as a storage medium for storing various information acquired through the sensing part 110 and may store all of various information generated while the data logging device 100 is operating. As a specific example, the memory part 160 may be a memory semiconductor such as Non-volatile memory (NVM).

The data logging device 100 according to one embodiment of the present invention may also further include a communication part 170 for transmitting and receiving data through wireless communication.

That is, the communication part 170 may include an antenna pattern 172 formed into a pattern on one surface of the flexible circuit board 102.

Such a communication part 170 may transmit the information stored in the memory part 160 to an external electronic device through a wireless method. Here, the external electronic device may be an electronic device having a built-in wireless communication module corresponding to the communication part 170 and may be a portable terminal such as a smartphone.

As a specific example, the communication part 170 may be an Near-field Communication (NFC) antenna module including an antenna pattern 172 formed into a pattern on one surface of the flexible circuit board 102.

Accordingly, when the mobile terminal having the built-in NFC antenna module is tagged to the communication part 170, the information stored in the memory part 160 may be transmitted to the mobile terminal.

Accordingly, the user or the operator can identify the information on the abnormal state occurred in the process of delivery or storage of the logistics item by checking information stored through the sensing part 110 in the process of delivering or storing logistics item.

However, the utilization of data information using the memory part 160 and the communication part 170 is not limited thereto, and various data measured through the sensing part 110 may be transmitted to a server or an electronic device located remotely or at a short distance through the communication part 170.

The cover member 150 may prevent the sensing part 110, the indication part 120, the control part 130, the communication part 170, and the power supply part 140 along with the flexible circuit board 102 from being exposed to the outside.

That is, the cover member 150 is provided to cover both surfaces of the flexible circuit board 102 in order to prevent the flexible circuit board 102, the sensing part 110, the indication part 120, the control part 130, and the communication part 170 and the power supply part 140 from being exposed to the outside.

In this case, the cover member 150 may be made of a material having a flexibility like the flexible circuit board 102.

Accordingly, the data logging device 100 according to one embodiment of the present invention may be attached, in a bent state, to a curved portion like a sticker by securing flexibility through the flexible circuit board 102 and the cover member 150.

For example, the cover member 150 may be in the form of a fluoropolymer resin such as Polyethylene terephthalate (PET), Polypropylene (PP), Polyethylene (PE), a sheet type such as a release paper, or a molding type covered by a resin material made of a material such as silicone or polyurethane. However, the material of the cover member 150 is not limited thereto, and any material having flexibility may be used without limitation.

Here, one surface of the cover member 150 may be provided with an adhesive layer for adhesion to the logistics item or container 20. In this case, a separate release film (not shown) may be provided on one surface of the adhesive layer to prevent the adhesive layer from being exposed to the outside when not in use, and the release film may be removed when the data logging device 10 according to one embodiment of the present invention to the logistic item or container 20 is attached.

Meanwhile, the data logging device 100 according to one embodiment of the present invention may further include a Quick Response (QR) code 180 provided on the exposed surface of the cover member 150.

Such a QR code 180 may be attached to one surface of the cover member 150 through a lamination process, and the QR code 180 may include various information on the logistics item.

For example, the QR code 180 may include various information of the logistics item such as a production date, a producer, a storage method, and a distribution period of the logistics item. Accordingly, the user can scan the QR code 180 to conveniently acquire various information on logistics item.

Although one embodiment of the present invention has been described above, the spirit of the present invention is not limited to the embodiment presented in the present specification, and those skilled in the art, who understand the spirit of the present invention, may easily propose other embodiments by adding, changing, deleting, supplementing, and the like, but within the scope of the present invention.

The invention claimed is:

1. A data logging device comprising:
a sensing part mounted on one surface of a flexible circuit board and including a sensor configured to sense at least one information;
an indication part configured to irreversibly indicate, when an abnormal state is detected based on information measured through the sensing part, the abnormal state;
a control part configured to control operations of the sensing part and the indication part;

a power supply part configured to supply driving power to the control part; and a cover member configured to prevent the sensing part, the indication part, the control part, and the power supply part from being exposed to outside, wherein the indication part includes resistance patterns formed into a pattern on one surface of the flexible circuit board and configured to generate, when detecting the abnormal state, heat through driving of the control part and irreversible color-changing materials disposed on an upper portion of the resistance patterns and configured to be discolored by the heat transferred from the resistance patterns.

2. The device of claim 1, wherein the sensing part includes at least one of a temperature sensor, a humidity sensor, an acceleration sensor, an illumination sensor, and an ultraviolet (UV) sensor.

3. The device of claim 1, wherein the irreversible color-changing materials are attached on an inner surface of the cover member, and the cover member includes openings formed through regions corresponding to the irreversible materials.

4. The device of claim 1, wherein the indication part includes a first indicator configured to indicate a normal operation state, a second indicator configured to indicate the abnormal state, and a third indicator configured to indicate power on/off.

5. The device of claim 1, wherein the power supply part is a printing battery.

6. The device of claim 1 further comprising a communication part formed into a pattern on one surface of the flexible circuit board and configured to transmit and receive data through wireless communication.

7. The device of claim 6, wherein the communication part is a Near-field communication (NFC) antenna module.

8. The device of claim 1 further comprising a memory part configured to store information measured through the sensing part.

9. The device of claim 1 comprising a Quick Response (QR) code provided on an exposed surface of the cover member.

10. The device of claim 1, wherein the cover member is made of a flexible material.

* * * * *